United States Patent
Gledhill et al.

Patent Number: 5,815,099
Date of Patent: Sep. 29, 1998

[54] METHOD AND APPARATUS FOR DIFFERENTIALLY DECODING SIGNALS

[75] Inventors: Jeff Gledhill; Santosh Anikhindi; Graham William Cradock, all of Hampshire, United Kingdom

[73] Assignee: Digi-Media Vision Ltd., Middlesex, United Kingdom

[21] Appl. No.: 736,379

[22] Filed: Oct. 23, 1996

[30] Foreign Application Priority Data

Mar. 18, 1996 [GB] United Kingdom ............ 9522241

[51] Int. Cl.$^6$ .................................................. H04L 27/233
[52] U.S. Cl. .................................................. 341/94; 371/35
[58] Field of Search .................. 341/94, 50; 370/284; 375/330, 244; 371/30, 31, 35, 37.7

[56] References Cited

U.S. PATENT DOCUMENTS 4,567,591 1/1986 Gray et al. .
4,660,196 4/1987 Gray et al. .

FOREIGN PATENT DOCUMENTS

WO-93/06550 4/1993 European Pat. Off. .

OTHER PUBLICATIONS

CD3–OFDM: A New Channel Estimation Method to Improve the Spectrum Efficiency in Digital Terrestrial Television Systems. Mignone et al.; pp. 122–128; Sep. 1995; ISBN 0–85296–644–x ;UK.

V. Mignone, et al., IBC, A New Channel Estimation Method to Improve the Spectrum Efficiency in Digital Terrestrial Television Systems, 95 International Broadcasting Convention, CD3–OFDM, abstract, Conference Publication No. 413, Sep. 1995, pp. 122–128.

F. Adachi, Reduced–state Viterbi Differential Detection Using a Recursively Estimated Phase Reference For M–ary DPSK, IEE Communications, col. 142, No. 4, Aug. 1995, pp. 263–270.

*Primary Examiner*—Howard L. Williams
*Assistant Examiner*—Peguy JeanPierre
*Attorney, Agent, or Firm*—Meltzer, Lippe, Goldstein et al.

[57] ABSTRACT

The present invention relates to a method and apparatus in which a differentially coded signal having forward error correction added to the encoded data can be decoded with an improved bit error rate performance Apparatus for decoding a differentially encoded input signal having forward error correction added to the encoded data, the apparatus comprising: a differential decoder to receive the input signal and to decode the data in each differentially encoded signal interval thereof by reference to the data in a previous differentially encoded signal interval; error correcting means to correct errors in the decoded signal form the decoder; and means for supplying to the decoder the corrected data from each signal interval to act as a reference for decoding the data in a following signal interval.

14 Claims, 1 Drawing Sheet

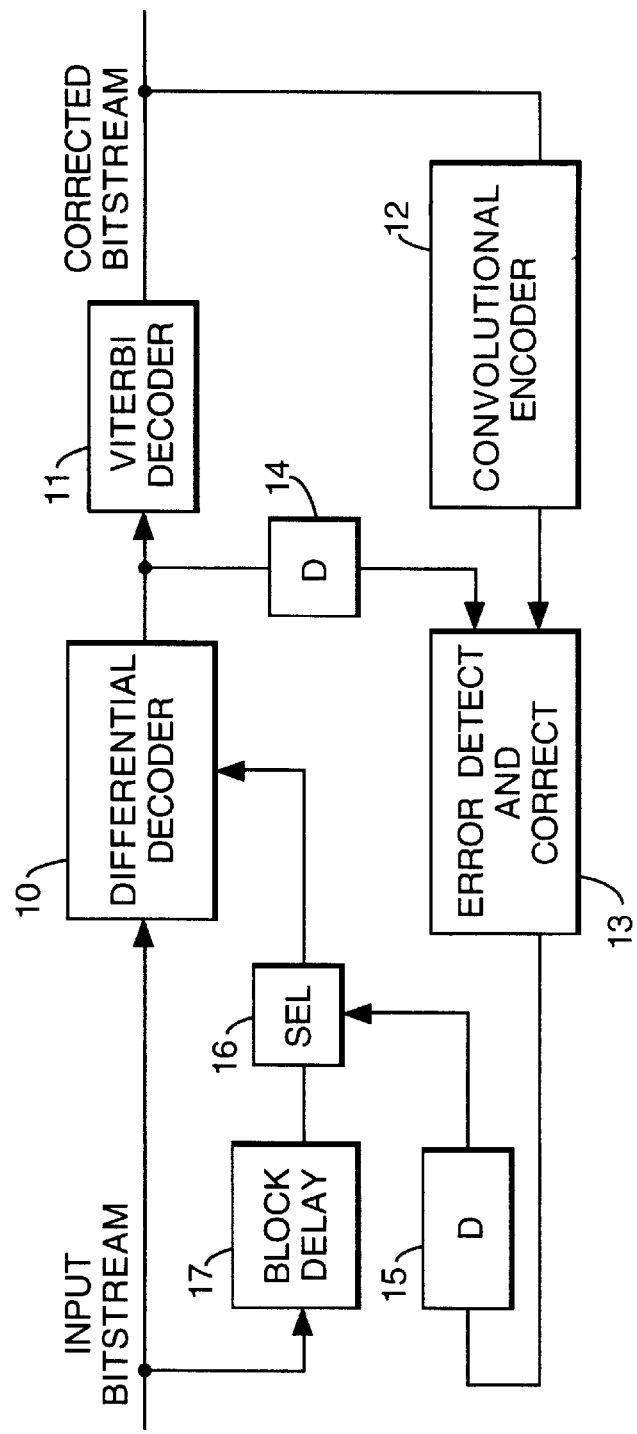

METHOD AND APPARATUS FOR DIFFERENTIALLY DECODING SIGNALS

The present invention relates to a method and apparatus for decoding signals which have been differentially encoded. The invention is applicable to decoding signals at a receiver which have been digitally modulated.

Transmission systems which use absolute phase modulation to transmit data symbols to a receiver require a phase reference at the receiver in order to demodulate the transmitted modulated symbols. This is normally generated at the receiver from the received modulated signal using a non-linear operator. The phase reference extracted from the received signal will however have a phase ambiguity.

The phase ambiguity problem resulting from extracting the phase reference from the received modulated signal can be overcome by differentially encoding the data symbols as phase differences between successive information bits. For example in binary phase shift keying (BPSK), the binary information bit 1 may be transmitted by shifting the phase of the carrier by 180 degrees in the respective signaling interval relative to the phase of the previous signaling interval. To transmit a binary information bit 0, a zero phase shift occurs from one signaling interval to the next. This encoding takes place in an encoder which precedes the modulator.

Decoding of the differentially encoded BPSK signal is performed conventionally using a phase comparator that compares the phase of succeeding signal intervals of a carrier in order to extract the phase difference between each signaling interval and the next. No phase reference needs to be generated as the information is inferred from the phase differences between successive signaling intervals. A delay of one symbol is however needed at the receiver to allow the carrier phase in each signal interval to be compared with the delayed phase of the carrier in the previous signal interval. The channel used to transmit the differentially encoded signal must be quasi-stationary for the interval between two signal intervals to ensure that phase shifts induced by the channel are approximately the same from one signal to the next.

The use of a differentially coded modulation technique has brought with it a reduction in the bit error rate (BER) performance. This is because a single channel error will result in approximately two errors in decoding because the decoding depends on detecting relative phase differences.

An improvement in performance can be achieved by employing a transmission system with forward error correction (FEC). Errors induced by the transmission channel are corrected using redundancy in the data which is added at the transmitter.

The present invention relates to a method and apparatus in which a differentially coded signal having forward error correction added to the encoded data can be decoded with an improved bit error rate performance.

According to the present invention there is provided a method of decoding a differentially encoded input signal having forward error correction added to the encoded data, the method comprising the steps of, applying the input signal to a differential decoder to decode the data in each differentially encoded signal interval by reference to the date in a previous differentially encoded signal interval, applying the decoded signal to error correcting means to correct errors in the decoded data, and applying to the decoder the corrected decoded data for each signal interval to act as a reference for decoding the data in the succeeding signal interval.

Further according to the present invention, there is provided apparatus for decoding a differentially encoded input signal having forward error correction added to the encoded data the apparatus comprising, a differential decoder to receive the input signal and to decode the data in each differentially encoded signal interval thereof by reference to the data in a previous differentially encoded signal interval, error correcting means to correct errors in the decoded signal from the decoder, and means to supply to the decoder the corrected decoded data from each signal interval to act as a reference for decoding the data in the succeeding signal interval.

In the method and system according to the invention, the data in each signal interval from the decoder is subject to error correction before being used as a reference for decoding the data in the next signal interval. This means that the penalty of doubling the error rate normally associated with differential decoding is removed.

The invention will now be further described, by way of example, with reference to the accompanying drawing which is a block diagram of a signal receiver embodying the invention.

An input bitstream is supplied to a differential decoder 10. The input bitstream consists of an OFDM signal including a sequence of blocks of data. Each block includes a spectrum of carriers which are differentially phase encoded and the encoding includes added forward error correction.

The differential phase encoding of the input bitstream is decoded by the decoder 10 to produce a sequence of bits, which may represent hard or soft decision information, which are passed to a Viterbi decoder 11. The Viterbi decoder functions to correct the decoded bitstream from the decoder 10 in a manner well known. The corrected bitstream is passed to a convolutional encoder 12 to be re-encoded and then passes to an error detect and correct circuit 13. A delay means 14 receives the decoded output from the decoder 10, subjects the output from the decoder 10 to a delay and applies the delayed decoder output to the error detect and correct circuit 13 for comparison with the re-encoded bitstream from the encoder 12. The circuit 13 functions to detect and correct errors in the bitstream and supplies a corrected bitstream through a further delay means 15 to a selection device 16.

A block delay device 17 receives the input bitstream and delays the input by one block before application to the selection device 16. The selection device makes a selection between the delayed input from the delay means 15 and the delayed input from the block delay 17. The selection is based on an algorithm which determines whether an error burst at the output of the error correction subsystem including the decoder 11, the encoder 12 and the error detect and correction circuit 13 would lead to correct data in the input bitstream being changed. If such an error burst is detected, the selection device 16 selects the signal from the block delay 17 for application to the differential decoder 10. Alternatively, the signal from the delay means 15 is selected for application to the differential decoder 10. It will be apparent that the delay imposed by the delay means 15 is used to make each block of the input bitstream coincident with the preceding corrected block taking account of the processing time required by the elements 11, 12 and 13.

The differential decoder 10 decodes the data within each signal interval of the input bitstream by reference to the data supplied by way of the selection device 16. When the selection device selects corrected data from the delay means 15, each symbol which is in error in the input bitstream is corrected before it is used as a reference for decoding the succeeding symbol. By this means, the penalty of doubling the error rate which is normally associated with differential encoding is avoided.

We claim:

1. Apparatus for decoding a differentially encoded input signal having forward error correction added to the encoded data, the apparatus comprising:

a differential decoder to receive the input signal and to decode the data in each differentially encoded signal interval thereof by reference to the data in a previous differentially encoded signal interval;

an error correcting circuit for correcting errors in the decoded signal from the decoder; and a feedback loop for supplying to the decoder the error corrected decoded data from each signal interval to act as a reference for decoding the data in a following signal interval.

2. Apparatus according to claim 1, wherein the error correcting circuit includes a delay which delays the input signal so that the input signal and the corrected decoded data are supplied to the decoder at substantially the same time.

3. Apparatus according to claim 2, wherein the error correcting means includes a second decoder and an encoder.

4. Apparatus according to claim 3, wherein the second decoder is a Viterbi decoder.

5. Apparatus according to claim 4, wherein the encoder is convolutional encoder.

6. Apparatus according to claim 5 for decoding an OFDM signal.

7. Apparatus according to claim 6, wherein said apparatus being a receiver.

8. Apparatus according to claim 6, wherein said apparatus being included in a broadcast system.

9. A method of decoding a differentially encoded input signal having forward error correction added to the encoded data, the method comprising the steps of:

applying the input signal to a differential decoder to decode the data in each differentially encoded signal interval by reference to the data in the previous differentially encoded signal interval;

applying the decoded signal to an error correcting circuit to correct errors in the encoded signal interval.

10. The method of claim 9, further comprising delaying the input signal so that the input signal and the corrected decoded data are supplied to the decoder at substantially the same time.

11. The method of claim 10, wherein the step of applying the decoded signal to error correcting means comprises applying the decoded signal to a second decoder and an encoder to identify the corrected decoded information.

12. The method of claim 11, further comprising providing the second decoder as a Viterbi decoder.

13. The method of claim 11, further comprising providing the encoder as a convolution encoder.

14. The method of receiving a broadcast signal comprising decoding the signal in accordance with the method of any claim 13.

* * * * *